May 11, 1948.　　　J. W. CAMERON　　　2,441,469
MONITORED CONVEYOR SYSTEM
Filed June 6, 1945　　　2 Sheets-Sheet 1
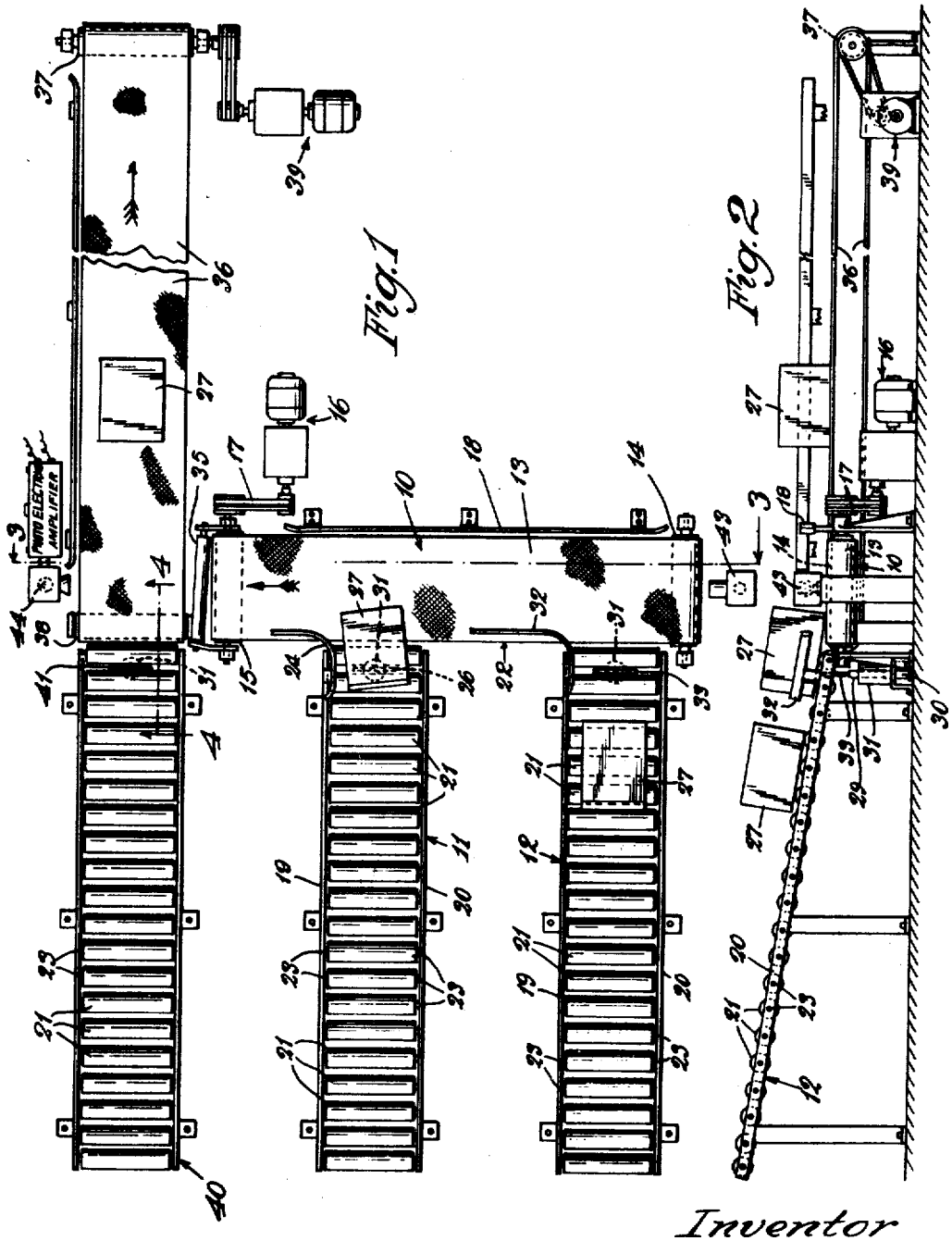

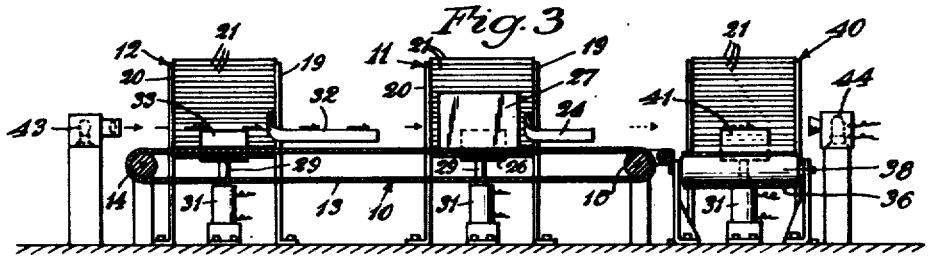
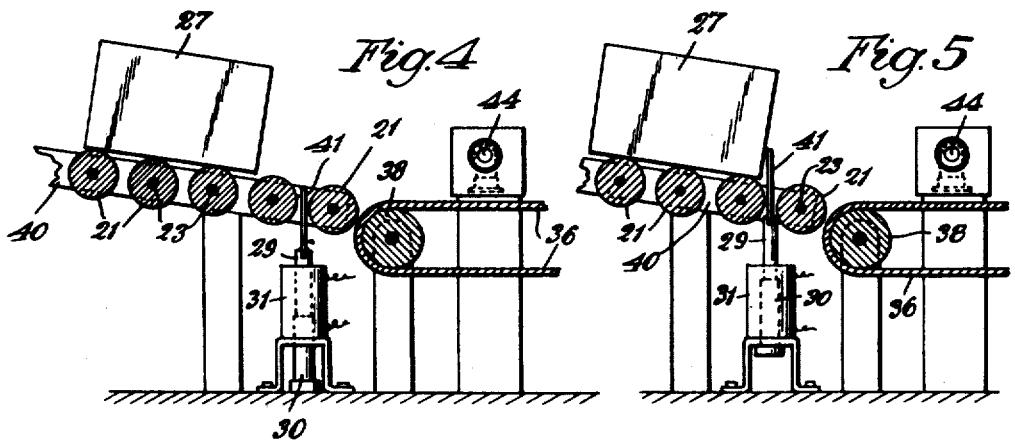
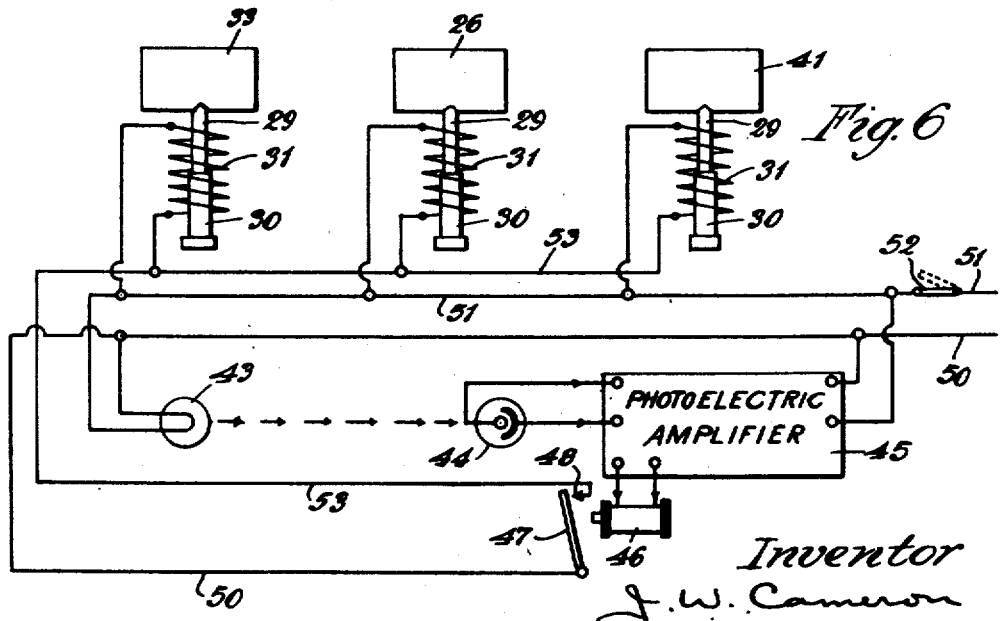

Patented May 11, 1948

2,441,469

UNITED STATES PATENT OFFICE 2,441,469

MONITORED CONVEYOR SYSTEM

Joseph W. Cameron, Chicago, Ill., assignor to Boyle-Midway Inc., Chicago, Ill., a corporation of Delaware Application June 6, 1945, Serial No. 597,858

7 Claims. (Cl. 198—79)

This invention relates to a conveyor system and particularly to a conveyor system having a plurality of feeder conveyors. In certain instances, it is necessary to arrange a plurality of feeder conveyors to discharge into a receiving conveyor. In such cases, it has been considered necessary to design the receiving conveyor with sufficient carrying capacity to handle the maximum peak load arising out of simultaneous discharge from all feeders. Unless the feeders operate with maximum load, such conveyor capacity is generally uneconomical and wasteful. On the other hand, if the receiving conveyor does not have sufficient conveyor capacity, confusion and possible loss of material from the conveyor may result at certain peak loads.

The invention herein describes a simple system wherein a pluraltiy of feeder conveyors may discharge onto one or more receiving conveyors with out the necessity for providing excessive conveyor capacity. The invention in general provides a receiving conveyor onto which feeder conveyors may discharge directly and means for controlling the rate of discharge onto said receiving conveyor to prevent congestion and disorder in said receiving conveyor. By virtue of the invention herein, it is possible to use a receiving conveyor having sufficient capacity for average traffic, with means for preventing undesirable peak loading.

In accordance with the invention, there is provided a length of receiving conveyor onto which any number of feeder conveyors may discharge. This length of receiving conveyor or a desired portion thereof is monitored by suitable automatic means so that immediately after the discharge of a package or material on said conveyor, all feeder conveyors are prevented from discharging until said package or article is removed from the monitored portion of the receiving conveyor.

Referring to the drawing, Figure 1 is a top view, looking down upon a conveyor system embodying this invention. Figure 2 is a side elevation of the conveyor system. Figure 3 is a section on line 3—3 of Figure 1. Figure 4 is a section on line 4—4 of Figure 1, showing a container on the verge of discharge from one of the feeder conveyors. Figure 5 is the same view as Figure 4 but showing the feeder conveyor conditioned to prevent discharge of container. Figure 6 is a circuit diagram of the control system in the conveyor system.

Receiving conveyor 10 has feeder branches 11 and 12 discharging material thereonto. Conveyor 10 may be of conventional type, with belt 13 of any suitable construction operating over two or more rollers 14 and 15 supported in any suitable frame. Motor 16 drives conveyor 10 through any suitable means such as belt 17. Conveyor 10 may have guard 18 disposed along one side thereof. Guard 18 may consist merely of a rail of any suitable material supported clear of the active top surface of conveyor 10. Feeder conveyors 11 and 12 are shown as of gravity feed type having rails 19 and 20 in spaced parallel relation supporting a plurality of rollers 21. As is clearly evident in Figure 2, rails 19 and 20 are supported so that they incline downwardly toward conveyor 10 and terminate near edge 22 of conveyor 10. Rollers 21 are freely rotatable in rails 19 and 20, each roller being suitably mounted in the manner shown by projecting centrally disposed pins 23. The precise form of conveyor construction forms no part of the present invention.

Guide rail 24 extends from feeder conveyor 11 to conveyor 10 at the junction of the two, the guide rail extending in the direction of travel of both conveyors.

At a suitable position near the discharge end of feeder 11, stop 26 may be mounted for vertical movement between two adjacent rollers. Stop 26 may have any desired shape and, as shown in the drawing, consists of a flat plate of metal or any other suitable material. Stop 26 is disposed between the conveyor rails and is wide enough to engage containers 27 travelling upon the conveyor. Stop 26 is carried on rod 29, the bottom portion 30 of which may be formed of iron. Iron portion 30 functions as the core of solenoid 31, disposed in a suitable case and mounted vertically below the conveyor.

While various means for operating the stop may be provided, the solenoid is simple and convenient. Thus, when solenoid 31 is energized, core 30 is pulled up, this serving to move stop 26 into operating position. Normally stop 26 is down in an inoperative position by virtue of gravity. Feeder 12 is similarly provided with guard rail 32 which extends from the side of feeder 12 around to the side of conveyor 10 along the direction of travel of conveyor 10. Feeder 12 is also provided with stop 33 disposed in a corresponding portion of the conveyor, this stop being operated in the same manner as stop 26.

While receiving conveyor 10 is shown as having two feeders 11 and 12, it is understood that the number of feeders may be increased to any desired figure. The top face of conveyor 10, travelling as shown by the arrow, tends to discharge material beyond motor driven roller 15. The end of receiving conveyor 10 is provided with idler roller 35, which may be disposed as shown in Figure 1 so that it is slightly skewed. Beyond conveyor 10 is main conveyor 36 which may be supported on any number of rollers desired and has at least two end rollers 37 and 38, respectively. Roller 37 is driven through a suitable pulley system by motor 39. Conveyor 36 is shown at right angles to conveyor 10; however, this is not essential. Conveyor 36 is operated so that any container will move toward roller 37 for final disposition.

Adjacent roller 38 may be an additional feeder 40 of the same general construction as feeders 11 and 12 and having stop 41 disposed between adjacent rollers near the discharge end of the feeder and operating like stop 20. It will be noted that feeder 40 is in line with conveyor 36, and like feeders 11 and 12 is preferably, though not necessarily, a gravity feed conveyor.

It is possible to dispense with a stop moving up and down between rollers and substitute therefor stops that may be supported directly above or above and to one side of the feeder out of the way of conveyors and may be dropped down or projected horizontally for stopping purposes.

For controlling the discharge from the various feeders, a monitor system operating just above the loading surface of conveyor 10 and the width of conveyor 36 is provided. This monitor system takes on the simple form of a light source 43 at one end of the monitor course, here shown as adjacent roller 14 of conveyor 10, and photoelectric cell 44 at the other end of the monitor course, here shown as beyond conveyor 36. It is understood that light source 43 provides a beam of light travelling just above conveyor 10 down the length thereof and normally impinging on photocell 44. Photocell 44 may be any one of a number of well-known cells on the market whose electrical condition is a function of the light falling thereon. In accordance with well-known practice, photocell 44 may be hooded to protect the same against extraneous light. Light source 43 is preferably sufficiently intense so that interruptions of the beam will cause a marked change in the electrical condition of photocell 44.

Photocell 44 controls an amplifier 45 of any suitable design. Inasmuch as the combination of a photocell and amplifier is well known and widely used, a detailed description of the amplifier is deemed to be unnecessary. Amplifier 45 has relay 46 in the output thereof, this relay having armature 47 cooperating with fixed contact 48. With a sufficiently powerful light beam and certain types of gas photocells, it is possible to use sensitive relays without the interposition of amplifiers. Such direct coupled photoelectric systems are also well known and may be used herein.

Referring to Figure 6, a circuit for the electrical portion of the system is shown. Thus, lines 50 and 51 may represent any source of electric power, such as the commercial 60 cycle, 110 volts. Switch 52 for controlling the system may be disposed in one of the lines, such as line 51. Amplifier 45 is bridged across the line for energization of the vacuum tubes. Each solenoid 31 may be bridged across line 51 and lead 53 running to contact 48. Armature 47, which carries a movable contact, is connected to line 50 so that closure of relay 46 will energize all three solenoids simultaneously. Lamp 43 is connected across lines 50 and 51, while photocell 44 is shown as feeding into amplifier 45.

It is understood that amplifier 45 is so arranged that, when the beam of light from lamp 43 falls on cell 44, relay 46 will be opened. When the beam is interrupted, relay 46 closes.

As is clearly evident, when a container has been discharged by any feeder into the monitoring path, the light beam will be interrupted and further discharge from all feeders will be stopped. As long as the light beam is interrupted, the stops in the various feeders will be in operative position. When the container finally leaves the monitoring path, the stops will drop and further discharge by the feeders will be possible.

It is clear that under maximum load the three feeders may simultaneously discharge, whereupon the stops will become operative until receiving conveyor 10 and the end portion of main conveyor 36 are clear. For that reason, it is desirable to have the monitoring path as short as possible.

By virtue of the invention herein, material from various points may be fed to a common conveyor with a minimum of conveyor capacity and a maximum of efficiency. The control system may be easily installed in standard conveyor equipment and, in the main, utilizes readily available standard equipment. The stops may be actuated either by solenoids as shown or indirectly by solenoids through the use of solenoid controlled air valves. The entire equipment, including the stops, may be made readily removable and applied to any desired places in a conveyor system.

The stops may be so designed that if a container is in the path of movement of a stop when it tends to go into its stopping position, the friction of the stop against a container will hold the latter against travel. Where stops are disposed as shown and containers are not too heavy, the stop may actually raise one end of the container and hold the same against travel.

What is claimed is:

1. A conveyor system comprising a receiving conveyor, a plurality of feeder conveyors discharging onto said receiving conveyor, said feeders being in parallel with each feeder discharging directly onto said receiving conveyor, stop means on each feeder, said stop means being normally biased in an inoperative position to permit the feeders to discharge onto said receiving conveyor but being positively operable to prevent feeder discharge, said receiving conveyor having a path above at least part of the loading surface as a monitoring path, photoelectric means operating along said monitoring path, said photoelectric means being sensitive to the presence of material on said receiving conveyor within said monitoring path, and powered means for simultaneously operating said stops under control of said photoelectric means, said last-named means being so arranged that upon the presence of material in said monitoring path said stops are simultaneously put into operative condition.

2. A conveyor system comprising a receiving conveyor having a supporting surface upon which material to be conveyed may rest, at least a portion of the space above said material supporting surface within which material may be disposed defining a monitoring path, a plurality of gravity feeder conveyors, each such feeder discharging directly onto said receiving conveyor, a stop for each feeder adjacent the discharge terminal, said stop being normally biased in an inoperative position and being positively movable to an operative position to prevent discharge of material by each feeder onto said receiving conveyor, photoelectric means operative along said monitoring path and responsive to the existence of material in said receiving conveyor, and powered means controlled by said photoelectric means for simultaneously operating said stops when said receiving conveyor has any material thereon.

3. A conveyor system comprising a receiving conveyor having a material-supporting surface with a monitoring path immediately above said surface along the length thereof, a plurality of feeder conveyors directly discharging onto said receiving conveyor, a main conveyor onto which said receiving conveyor discharges, said main conveyor being disposed at an angle to said receiving conveyor, the space above said main conveyor in line with said monitoring path constituting an additional monitoring section, photoelectric means operative over said monitoring path and additional monitoring section and responsive to the presence or absence of material to be conveyed along said entire monitoring path, individual stops for said feeders, said stops being disposed near the discharge terminal thereof, and means controlled by said photoelectric means for operating said stops to cut off any feeder discharge during the presence of any material along said monitor path and to render said stops inoperative at other times.

4. The system of claim 3 wherein said feeder conveyors are of the gravity type.

5. The system of claim 3 wherein said feeder conveyors are of the gravity type and have at least two spaced idler rollers near the discharge end thereof and wherein the stop means includes a plate vertically movable between said rollers.

6. A conveyor system comprising a receiving conveyor having a material-supporting surface with a monitoring region immediately above said surface along the length thereof, a plurality of feeder conveyors directly discharging onto said receiving conveyor, a photoelectric cell at one end of said monitoring path, means for directing a beam of light along said monitoring path into said cell, said beam being interrupted by the presence on said material supporting surface of any material being conveyed, a stop normally biased in an inoperative position at the discharge end of each feeder conveyor, and powered means under the control of said photoelectric cell for simultaneously moving said stops to operative positions during light beam interruption.

7. The structure of claim 6 wherein each stop comprises a member movable substantially vertically to the line of travel of said feeder conveyor vertically to the line of travel of said feeder conveyor, said member being normally disposed in a position out of the way of material on said feeder conveyors.

JOSEPH W. CAMERON.

REFERENCES CITED

The following references are of record in the file of this patent:

UNITED STATES PATENTS

| Number | Name | Date |
|---|---|---|
| 1,881,895 | Olson | Oct. 11, 1932 |
| 1,425,556 | Tingwall et al. | Aug. 15, 1922 |
| 1,923,447 | Marcy | Aug. 22, 1933 |
| 1,924,556 | Jennings et al. | Aug. 29, 1933 |
| 2,304,447 | Feusier | Dec. 8, 1942 |

---

Certificate of Correction

Patent No. 2,441,469.

May 11, 1948.

JOSEPH W. CAMERON

It is hereby certified that errors appear in the printed specification of the above numbered patent requiring correction as follows: Column 1, line 18, for "pluraltiy" read *plurality*; line 20, for "with out" read *without*; line 51, for the word "container" read *containers*; column 3, line 48, for "interruptions" read *interruption*; column 5, line 5, for the word "in" after "material" read *on*; column 6, lines 20 and 21, strike out "vertically to the line of travel of said feeder conveyor"; and that the said Letters Patent should be read with these corrections therein that the same may conform to the record of the case in the Patent Office.

Signed and sealed this 6th day of July, A. D. 1948.

[SEAL]

THOMAS F. MURPHY,
*Assistant Commissioner of Patents.* tion and being positively movable to an operative position to prevent discharge of material by each feeder onto said receiving conveyor, photoelectric means operative along said monitoring path and responsive to the existence of material in said receiving conveyor, and powered means controlled by said photoelectric means for simultaneously operating said stops when said receiving conveyor has any material thereon.

3. A conveyor system comprising a receiving conveyor having a material-supporting surface with a monitoring path immediately above said surface along the length thereof, a plurality of feeder conveyors directly discharging onto said receiving conveyor, a main conveyor onto which said receiving conveyor discharges, said main conveyor being disposed at an angle to said receiving conveyor, the space above said main conveyor in line with said monitoring path constituting an additional monitoring section, photoelectric means operative over said monitoring path and additional monitoring section and responsive to the presence or absence of material to be conveyed along said entire monitoring path, individual stops for said feeders, said stops being disposed near the discharge terminal thereof, and means controlled by said photoelectric means for operating said stops to cut off any feeder discharge during the presence of any material along said monitor path and to render said stops inoperative at other times.

4. The system of claim 3 wherein said feeder conveyors are of the gravity type.

5. The system of claim 3 wherein said feeder conveyors are of the gravity type and have at least two spaced idler rollers near the discharge end thereof and wherein the stop means includes a plate vertically movable between said rollers.

6. A conveyor system comprising a receiving conveyor having a material-supporting surface with a monitoring region immediately above said surface along the length thereof, a plurality of feeder conveyors directly discharging onto said receiving conveyor, a photoelectric cell at one end of said monitoring path, means for directing a beam of light along said monitoring path into said cell, said beam being interrupted by the presence on said material supporting surface of any material being conveyed, a stop normally biased in an inoperative position at the discharge end of each feeder conveyor, and powered means under the control of said photoelectric cell for simultaneously moving said stops to operative positions during light beam interruption.

7. The structure of claim 6 wherein each stop comprises a member movable substantially vertically to the line of travel of said feeder conveyor vertically to the line of travel of said feeder conveyor, said member being normally disposed in a position out of the way of material on said feeder conveyors.

JOSEPH W. CAMERON.

REFERENCES CITED

The following references are of record in the file of this patent:

UNITED STATES PATENTS

| Number | Name | Date |
|---|---|---|
| 1,881,895 | Olson | Oct. 11, 1932 |
| 1,425,556 | Tingwall et al. | Aug. 15, 1922 |
| 1,923,447 | Marcy | Aug. 22, 1933 |
| 1,924,556 | Jennings et al. | Aug. 29, 1933 |
| 2,304,447 | Feusier | Dec. 8, 1942 |

---

Certificate of Correction

Patent No. 2,441,469.

May 11, 1948.

JOSEPH W. CAMERON

It is hereby certified that errors appear in the printed specification of the above numbered patent requiring correction as follows: Column 1, line 18, for "pluraltiy" read *plurality*; line 20, for "with out" read *without*; line 51, for the word "container" read *containers*; column 3, line 48, for "interruptions" read *interruption*; column 5, line 5, for the word "in" after "material" read *on*; column 6, lines 20 and 21, strike out "vertically to the line of travel of said feeder conveyor"; and that the said Letters Patent should be read with these corrections therein that the same may conform to the record of the case in the Patent Office.

Signed and sealed this 6th day of July, A. D. 1948.

[SEAL]

THOMAS F. MURPHY,
*Assistant Commissioner of Patents.*